US011946663B2

United States Patent
Yu et al.

(10) Patent No.: US 11,946,663 B2
(45) Date of Patent: Apr. 2, 2024

(54) AIR CONTROL SYSTEM AND METHOD USING AIR IN ATMOSPHERE

(71) Applicant: UNIVERSITY OF SEOUL INDUSTRY COOPERATION FOUNDATION, Seoul (KR)

(72) Inventors: Byung Deok Yu, Seoul (KR); Hyunsoo Min, Seoul (KR); Junjin Jeon, Gwangju-si (KR); Jinwoo Park, Seoul (KR)

(73) Assignee: UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 337 days.

(21) Appl. No.: 17/299,887

(22) PCT Filed: Dec. 18, 2019

(86) PCT No.: PCT/KR2019/018012
§ 371 (c)(1),
(2) Date: Jun. 4, 2021

(87) PCT Pub. No.: WO2020/166808
PCT Pub. Date: Aug. 20, 2020

(65) Prior Publication Data
US 2022/0026100 A1 Jan. 27, 2022

(30) Foreign Application Priority Data
Feb. 15, 2019 (KR) .......................... 10-2019-0017978

(51) Int. Cl.
*F24F 11/77* (2018.01)
*B64B 1/44* (2006.01)
(Continued)

(52) U.S. Cl.
CPC ................ *F24F 11/77* (2018.01); *B64B 1/44* (2013.01); *F24F 5/0046* (2013.01); *F24F 11/89* (2018.01);
(Continued)

(58) Field of Classification Search
CPC ...... F24F 11/77; F24F 5/0046; F24F 13/0263; F24F 2110/76; B64B 1/44; G01W 1/08
See application file for complete search history.

(56) References Cited

U.S. PATENT DOCUMENTS 3,521,493 A * 7/1970 Pannetier ................. G01N 1/22
73/170.28
5,147,429 A * 9/1992 Bartholomew ........ B01D 53/74
244/30
(Continued)

FOREIGN PATENT DOCUMENTS

JP 2010-121854 6/2010
KR 20-1990-0006889 8/1990
(Continued)

OTHER PUBLICATIONS

English machine translation of Lee et al., Korean Patent Application KR20090025655A, dated Mar. 26, 2009. (Year: 2009).*
(Continued)

*Primary Examiner* — Marc E Norman
(74) *Attorney, Agent, or Firm* — LEX IP MEISTER, PLLC

(57) ABSTRACT

An air control system and method using air in an upper zone of the atmosphere are disclosed. An air control system using air in an upper zone of the atmosphere includes: a floating body 11 provided to stay in the upper zone of the atmosphere; air transporting pipes 15a and 15b interlocked with the floating body 11 to transport air in the upper zone of the atmosphere; blowers 22a and 22b mounted below the air
(Continued)

transporting pipe 15a and 15b; and an air transporting controller 18 controlling an operation of the blowers 22a and 22b. According to the embodiment of the present invention, it is possible to implement functions such as cooling, drying, and purifying of the surrounding air, removing mist, or generating clouds through the transport of dry and low-temperature clean air in the upper zone of the atmosphere with a simple structure. In addition, according to the embodiment of the present invention, it is possible to freely adjust a height of air control because there is no need to install a post tower to support an elevating device because it supports the floating body 11 on the ground without the post tower.

6 Claims, 3 Drawing Sheets

(51) Int. Cl.
*F24F 5/00* (2006.01)
*F24F 11/89* (2018.01)
*F24F 13/02* (2006.01)
*F24F 110/76* (2018.01)

(52) U.S. Cl.
CPC ....... *F24F 13/0263* (2013.01); *F24F 2110/76* (2018.01)

(56) References Cited

U.S. PATENT DOCUMENTS

| | | | | |
|---|---|---|---|---|
| 5,295,625 | A | 3/1994 | Redford | |
| 5,357,865 | A | 10/1994 | Mather | |
| 6,685,760 | B2 | 2/2004 | Huehn et al. | |
| 7,776,295 | B2 * | 8/2010 | Konigorski | B64B 1/20 244/4 R |
| 8,920,537 | B2 * | 12/2014 | Seike | B03C 3/017 96/417 |
| 2014/0332052 | A1 * | 11/2014 | Yacoubian | F24F 1/58 136/246 |
| 2016/0121991 | A1 * | 5/2016 | Tung | B64B 1/50 244/33 |
| 2017/0129579 | A1 * | 5/2017 | de Jong | B64B 1/44 |

FOREIGN PATENT DOCUMENTS

| | | |
|---|---|---|
| KR | 10-2003-0065931 | 8/2003 |
| KR | 10-2009-0040876 | 4/2009 |
| KR | 10-1191874 | 10/2012 |
| KR | 10-1216769 | 12/2012 |
| KR | 10-1503736 | 3/2015 |
| KR | 10-2016-0017171 | 2/2016 |

OTHER PUBLICATIONS

Frederick K. Lutgens et al., "The atmosphere: An introduction to meteorology", 10thEd., Pearson (2007).
KIPO, PCT/ISA/210 & 237 of PCT/KR2019/018012, dated May 6, 2020.

* cited by examiner

AIR CONTROL SYSTEM AND METHOD USING AIR IN ATMOSPHERE

TECHNICAL FIELD

The present invention relates to an air control system and method using air in an upper zone of the atmosphere. More specifically, the present invention relates to an air control system and method using air in an upper zone of the atmosphere that implements functions such as cooling, drying, air purification, mist removal, or cloud generation through the transport of dry and low-temperature clean air in an upper zone of the atmosphere.

BACKGROUND ART

Generally, fossil fuels are used for cooling and refrigeration, or electrical energy produced by using fossil fuels or nuclear power is used, but the fossil fuel method has a problem of polluting the environment due to various pollutants including carbon dioxide emitted during the combustion process.

In addition, since resources of these fossil fuels are limited in quantity, alternative energy technologies are being actively developed to overcome this problem.

These alternative energy technologies include wind, solar, and solar technologies. Although cooling and refrigeration are performed by using electric power produced by the alternative energy, energy conversion efficiency from the alternative energy to the electric power and from the electric power to the cooling and refrigeration is low, so that there is a problem in that the cost of cooling and refrigeration is high.

Regarding more direct heat exchange, there is a cooling and refrigeration technology using snow.

In the above technology, snow that naturally falls in winter may be collected and stored in the vicinity of places in which cooling and refrigeration are performed. However, in the case of the above technology, there are various environmental problems, such as many kinds of dirty substances that are included in the snow, and accordingly, the snow storage must be cleaned after the snow melts, and the melted water also contains contaminated substances.

To prevent these problems from occurring, uncontaminated snow must be transported from a distance. However, transporting uncontaminated snow in large quantities does not save energy, and causes a problem that requires a large amount of transport energy.

As a technology for solving such a problem, there is a technology such as Japanese Laid-Open Patent No. 2010-121854 (2010 Jun. 3, hereinafter referred to as the 'prior art').

The above-described prior art relates to a technology using artificially made snow instead of naturally falling snow in winter for cooling or refrigeration, and it specifically discloses a technical configuration capable of environment-friendly cooling and refrigeration by using artificial snow made of purified clean water in the snow storage.

In the case of the above prior art, it is possible to obtain an environmentally-friendly technical effect by using artificial snow, but there are problems that energy consumption due to forcibly making artificial snow with purified water in a cold period occurs, and that a lot of cost is required for the operation of the device, such as having to maintain and store the artificial snow made in this way until the hot weather in which cooling and refrigeration are required.

Hereinafter, the prior art will be described in more detail.

An air temperature in the atmosphere varies with height. Particularly, in the case of the troposphere, the temperature decreases with the height at an environmental lapse rate of −6.5° C./km. (The atmosphere; An introduction to meteorology, 10th Ed., F. K. Lutgens and E. J. Tarbuck, Pearson 2007)

For example, in the case of a 2 km height in the atmosphere, the air temperature is lowered by 13° C. compared to the ground part, and a technology related to air cooling using this principle is disclosed in Korean Patent No. 10-1503736 (title: Atmospheric heat exchange system and heat exchange method using the same, registration date: 2015 Mar. 12).

In the case of the above-mentioned prior art, a heat exchange object such as water is moved up and down by an elevating device onto a floating body residing in an upper zone of the atmosphere to perform heat exchange through the atmosphere.

However, in the case of the above-mentioned prior art, there is a problem that installation costs are high because the elevating device for elevating the heat exchange object and the heat exchange object such as water are required.

In addition, Korean Patent No. 10-1216769 (title: Coal drying system using large capacity superheated steam, registration date; 2012 Dec. 21) is disclosed in relation to air drying.

In the case of the prior art drying method, moisture contained in coal is dried with superheated steam and hot air obtained by combustion of fuel supplied from a gas tank.

Therefore, the prior art has a problem that it requires heating through the combustion of fuel, a superheated steam supplying pipe, and a high-temperature air blower in order to dry the coal.

In addition, U.S. Pat. No. 6,685,760 (title: Filter assembly for air purifier, registration date: 2004 Feb. 3) is disclosed in connection with air purification.

In the case of the air purification method of such a prior art, the structure in which air is introduced into the filter system to remove dust through the filter and air is discharged is provided.

Therefore, since this prior art may only purify air in a very limited area of space around the filter system, it is difficult to purify air in a wide range.

In addition, Korean Patent Registration No. 10-1191874 (title: Mist removal system, registration date: 2012 Oct. 10) is disclosed in relation to mist removal.

In the case of the mist removal method of this prior art, the mist is removed by lowering the relative humidity of the atmospheric air by spraying dry air generated by heating.

However, this prior art has problems that air must be heated to generate dry air, and a lot of energy is required for this heating.

Further, U.S. Pat. No. 5,357,865 (title: Method of cloud seeding, registration date: 1994 Oct. 25) is disclosed in relation to cloud generation.

This prior art sprays moisture-absorbing particles to generate clouds.

However, this prior art has a problem in that hygroscopic particles that absorb moisture are required for cloud generation.

DISCLOSURE

Technical Problem

The technical object to be achieved by the present invention is, for improving the conventional inconvenience, to provide an air control system and method using air in an upper zone of the atmosphere that implements functions such as cooling, drying, and purifying of the surrounding air at the ground or above the ground, removing mist, or generating clouds through the transport of dry and low-temperature clean air in an upper zone of the atmosphere with a simple structure.

In addition, the technical object to be achieved by the present invention is, for improving the conventional inconvenience, to provide an air control system and method using air in an upper zone of the atmosphere that may freely adjust a height of air control because there is no need to install a post tower to support an elevating device because it supports the floating body on the ground without the post tower.

Technical Solution

An air control system using air in an upper zone of the atmosphere according to features of the present invention for solving these problems includes:
a floating body 11 provided to stay in the upper zone of the atmosphere;
air transporting pipes 15a and 15b interlocked with the floating body 11 to transport air in the upper zone of the atmosphere;
blowers 22a and 22b mounted below the air transporting pipe 15a and 15b; and
an air transporting controller 18 controlling an operation of the blowers 22a and 22b.

The air control system using the air in the upper zone of the atmosphere may further include an air measuring device 12 measuring air quality in the upper zone of the atmosphere,
wherein the air transporting controller may control the blowers 22a and 22b in response to the air quality.

Air inflow parts 14a and 14b into which the air flows may be formed at upper portions of the air transporting pipes 15a and 15b, and
air discharging parts 16a and 16b from which the air is discharged may be formed at lower portions of the air transporting pipes 15a and 15b.

The air control system using the air in the upper zone of the atmosphere may further include a controller 21 receiving an input of the operator's selection, and the air transporting controller 18 may operate according to the selection of the controller 21.

The air transporting pipes 15a and 15b may be provided with a female thread air transporting pipe (15c) having a female thread type of fastening structure at an upper portion thereof and a male thread air transporting pipe 15d having a male thread type of fastening structure at a lower structure thereof.

A heat insulator that insulates the air transporting pipes 15a and 15b may be further included.

The floating body 11 may be provided with a gas regulator to control an amount of internal gas.

A floating height adjuster 23 may be provided so that a floating height of the floating body 11 is controlled through the air transporting controller 18.

The floating height adjuster 23 may include:
a fixed floating body wire 13 connected to limit the floating height of the floating body 11; and
a floating body power source 19 provided at an end of the fixed floating body wire 13 and providing power to wind or unwind the fixed floating body wire.

An air control method using air in an upper zone of the atmosphere according to features of the present invention for solving these problems includes:
floating a floating body 11;
fastening air transporting pipes 15a and 15b to a floating body fixing wire 13;
measuring air quality in the upper zone of the atmosphere;
fixing the floating body 11 when the air quality satisfies a predetermined condition; and
operating the air transporting device to transport the air in the upper zone of the atmosphere to the ground or to the upper portion of the ground of a desired height.

Advantageous Effects

According to the embodiment of the present invention, it is possible to provide an air control system and method using air in an upper zone of the atmosphere that implements functions such as cooling, drying, and purifying of the surrounding air in the ground or above the ground, removing mist, or generating clouds through the transport of dry and low-temperature clean air in the upper zone of the atmosphere with a simple structure.

In addition, according to the embodiment of the present invention, it is possible to provide an air control system and method using air in an upper zone of the atmosphere that may freely adjust a height of air control because there is no need to install a post tower to support an elevating device because it supports the floating body on the ground without the post tower.

MODE FOR INVENTION

Figure 1:
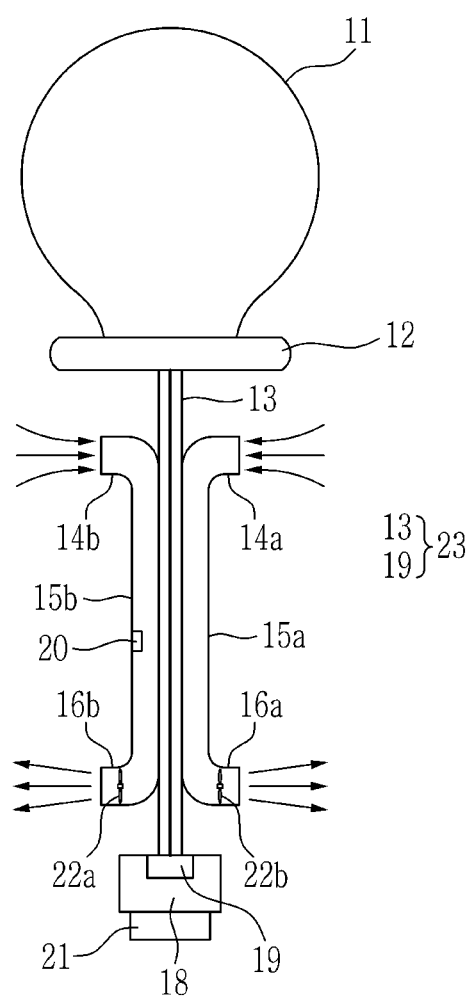
FIG. 1 illustrates a schematic diagram of an air control system using air in an upper zone of the atmosphere according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Figure 2:
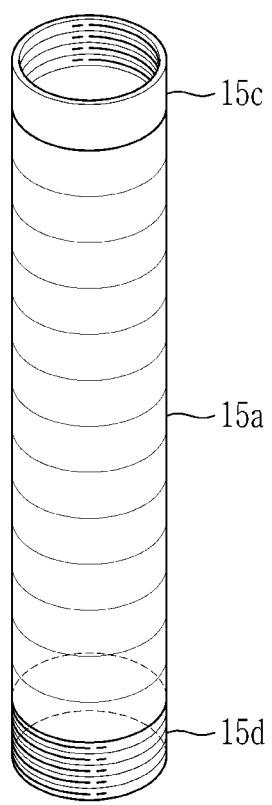
FIG. 2 illustrates an air transport pipe of an air control system using air in an upper zone of the atmosphere according to an embodiment of the present invention.

FIG. 1 illustrates a schematic diagram of an air control system using air in an upper zone of the atmosphere according to an embodiment of the present invention, and FIG. 2 illustrates an air transport pipe of an air control system using air in an upper zone of the atmosphere according to an embodiment of the present invention.

Referring to FIG. 1 and FIG. 2, an air control system using air in an upper zone of the atmosphere according to an embodiment of the present invention includes:
- a floating body 11 provided to stay in the upper zone of the atmosphere;
- air transporting pipes 15a and 15b interlocked with the floating body 11 to transport air in the upper zone of the atmosphere;
- blowers 22a and 22b mounted below the air transporting pipe 15a and 15b; and
- an air transporting controller 18 controlling an operation of the blowers 22a and 22b.

The air control system using the air in the upper zone of the atmosphere further includes an air measuring device 12 measuring air quality in the upper zone of the atmosphere, wherein the air transporting controller 18 controls the blowers 22a and 22b in response to the air quality.

Air inflow parts 14a and 14b into which the air flows are formed at upper portions of the air transporting pipe 15a and 15b, and Air discharging parts 16a and 16b from which the air is discharged are formed at lower portions of the air transporting pipes 15a and 15b.

It further includes a controller 21 receiving an input of the operator's selection, and the air transporting controller 18 operates according to the selection of the controller 21.

The air transporting pipes 15a and 15b are provided with a female thread air transporting pipe 15c having a female thread type of fastening structure at an upper portion thereof and a male thread air transporting pipe 15d having a male thread type of fastening structure at a lower structure thereof. Through this, it is possible to provide an air transporting pipe of a desired length. That is, the length may be adjusted by connecting a plurality of air transporting pipes.

A heat insulator that insulates the air transporting pipes 15a and 15b may be included.

The floating body 11 is provided with a gas regulator to control an amount of internal gas.

A floating height adjuster is provided so that a floating height of the floating body 11 is controlled through the air transporting controller 18.

The floating height adjuster includes:
- a fixed floating body wire connected to limit the floating height of the floating body 11; and
- a floating body power source 19 provided at an end of the fixed floating body wire and providing power to wind or unwind the fixed floating body wire.

A temperature, humidity, and dust concentration of the air in the atmosphere are varied with height.

By utilizing the characteristics of atmospheric air, in the present invention, it is possible to transport the air in the upper zone of the atmosphere having a desired temperature, humidity, and dust concentration of the air on the ground portion to the ground portion.

In order to transport the air in the upper zone of the atmosphere, the floating body 11 is provided with a ground fixing wire 13, and the wire is provided with the air transporting pipes 15a and 15b and the blowers 22a and 22b.

In a case of a single transporting structure, since rotation of the air transporting structure may occur due to rotation of the blowers 22a and 22b, a dual or quad air transporting structure is provided in order to stabilize the rotational motion. The air transporting structure may include the air transporting pipes 15a and 15b and the blowers 22a and 22b.

In order to more effectively fasten the air transporting pipes 15a and 15b to the floating body air inflow parts 14a and 14b and the floating body fixing wire 13, the air transporting pipes 15a and 15b configured of female threads and male threads may be provided.

The floating body fixing wire 13 is fixed to the ground to transport the air to the surrounding area.

The floating body fixing wire 13 may be fixed to the ground, and the floating body power source 19 of the air transporting system may be provided on the ground.

In a system in which the floating body 11 is connected to the ground part by the floating body fixing wire 13, a ground connecting part may be implemented as a mobile vehicle.

By allowing the floating body 11 to move over a designated area above the ground, it is possible to transport a wider area of the air to the ground or over the ground.

For the moving of the floating body 11, the power source 19 of the moving of the floating body 11 and of the air control system is provided in the floating body 11. A technology related to such a floating body 11 is disclosed in Korean Patent No. 10-1726803 filed by the present applicant. In the embodiment of the present invention, this technology is used. In addition, the air transporting controller 18 controls the operation of the floating body power source 19 of the floating height adjuster (not shown), and controls the floating body power source 19 and the air measuring device 12 through wireless or wired communication so as to receive a measurement signal from the air measuring device 12.

In addition, the air measuring device 12 is interlocked with the floating body 11 to measure the temperature, humidity, dust concentration, wind strength, and oxygen concentration of the air in the upper zone of the atmosphere and output them to the air transporting controller 18.

The controller 21 for controlling the air transporting pipes 15a and 15b by wire or wireless is provided on the floating body 11 or on the ground.

When an oxygen concentration of the air transported from the upper portion of the atmosphere to the ground through the air transporting pipes 15a and 15b is thin, an oxygen generator 20 is additionally provided on the ground to eliminate a risk factor due to lack of oxygen during the transporting of the air.

The blowers 22a and 22b may be a crossflow type of airflow generating device disclosed in the known Korean Patent No. 10-1877916.

An air control method using air in an upper zone of the atmosphere according to an embodiment of the present invention having such a configuration will be described as follows.

Figure 3:
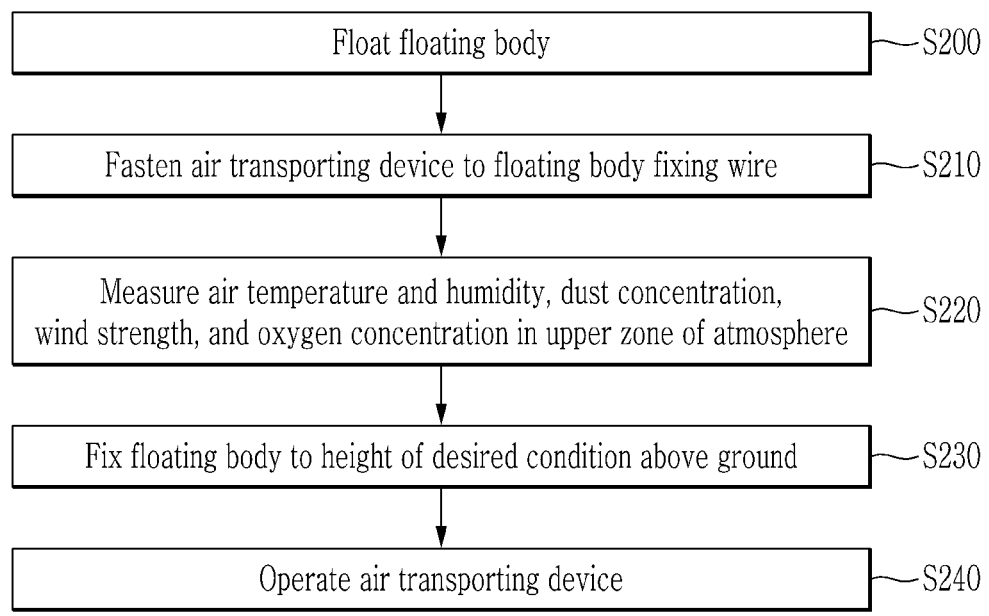
FIG. 3 illustrates an operation flowchart of an air control method using air in an upper zone of the atmosphere according to an embodiment of the present invention.

FIG. 3 illustrates an operation flowchart of an air control method using air in an upper zone of the atmosphere according to an embodiment of the present invention.

Referring to FIG. 3, the air control method using the air in the upper zone of the atmosphere according to the embodiment of the present invention includes: floating the floating body 11 (S200);
- fastening the air transporting pipes 15a and 15b to the floating body fixing wire 13 (S210);
- measuring air quality in the upper zone of the atmosphere (S220);
- fixing the floating body 11 when the air quality satisfies a predetermined condition (S230); and
- operating the air transporting device to transport the air in the upper zone of the atmosphere to the ground or to the upper portion of the ground of a desired height (S240).

The floating of the floating body 11 (S200) is a step in which the floating body 11 rises to a predetermined floating height in the upper zone of the atmosphere, by a floating body fixing wire 13 that is released by operating the floating body power source 19 through the control of the controller 18 in a state in which a floating gas is injected into the floating body 11.

The fastening of the air transporting pipes 15a and 15b to the floating body fixing wire 13 (S210) is a step of fastening the air transporting pipes 15a and 15b to the floating body fixing wire 13 of the floating body 11, and it may be performed in advance as necessary.

The measuring of the air quality in the upper zone of the atmosphere (S220) is a step of measuring the temperature, humidity, dust concentration, or oxygen concentration the air in the upper zone of the atmosphere to output them to the air transporting controller 18, and in this case, it is possible to determine whether the air level required for the ground is achieved. When an oxygen concentration of the air transported from the upper portion of the atmosphere to the ground through the air transporting pipes 15a and 15b is thin, an oxygen generator 20 is additionally provided in the air transporting pipes 15a and 15b or on the ground to eliminate a risk factor due to lack of oxygen during the transporting of the air.

When the air quality satisfies a predetermined condition, the fixing of the floating body 11 (S230) and the operating of the air transporting device to transport the air in the upper zone of the atmosphere to the ground or to the upper portion of the ground of a desired height (S240), after the air transporting controller 18 receives the air quality through the air measuring device 12 according to the function selected by the controller 21, fix the floating body 11 to a predetermined height in the upper zone of the atmosphere, and then operate the air transporting device to transport the air in the upper zone of the atmosphere to the ground or to the upper portion of the ground of the desired height.

These steps will be described in detail for each function as follows.

For example, when the cooling function is selected by the controller 21, the air transporting controller 18 cools the air above the ground by blowing dry and low temperature air in the upper zone of the atmosphere to the air discharging parts 16a and 16b of the air transporting pipes 15a and 15b.

Through this process, it is possible to provide more pleasant air quality air by cooling the hot and humid air above the ground in summer.

The air conditioner cools the indoor air, but at the same time, it has a problem of raising the air temperature in the outdoor part, while in the case of the present invention, the hot and humid air above the ground is pushed out of the cooling area by the dry, low-temperature, high-density air newly introduced to the ground.

This method may be applied both indoors and outdoors.

In addition, air cooling in a wider area may be realized by allowing the air transporting controller 18 to fly the floating body 11 in a designated area.

As necessary, the air transporting controller 18 may increase a cooling duration by cooling river water or lake water having high specific heat on the ground by using dry and low temperature air in the upper zone of the atmosphere.

The air transporting pipes 15a and 15b may also be implemented with a material having an adiabatic characteristic in order to increase cooling efficiency. As necessary, a heat insulating part may be provided outside or inside the air transporting pipes 15a and 15b.

In addition, when the drying function is selected by the controller 21, the air transporting controller 18 may blow dry air in the upper zone of the atmosphere to the air discharging parts 16a and 16b of the air control system to dry the object to be dried above the ground. This method may be simply implemented because it does not require a process of heating dry air to dry the object to be dried.

In addition, when the air purification function is selected by the controller 21, the air transporting controller 18 purifies air containing dust above the ground by blowing clean air in the upper zone of the atmosphere to the air discharging parts 16a and 16b of the air transporting pipes 15a and 15b.

Dust above the ground causes environmental problems in windless climate environments, and in this case, since the clean air discharged from the upper portion of the atmosphere to the ground through the air transporting pipes 15a and 15b is high-density air, it stays in a discharging area of the ground to purify the air in the discharging area.

In addition, when the mist removal function is selected by the controller 21, the air transporting controller 18 blows the dry air in the upper zone of the atmosphere to the air discharging parts 16a and 16b of the air transporting pipes 15a and 15b to spray it into a misty area of the ground, thereby lowering the humidity of the ground to remove the mist.

Particularly, it is possible to remove the mist by making the floating body 11 fly by applying the embodiment of the present invention to a road, a runway of an airport, a port, a coastal area, and the like in which mist frequently occur.

In addition, when the cloud generation function is selected by the controller 21, the floating body 11 is controlled so that the air discharging parts 16a and 16b of the floating body 11 are located at about the height of cloud formation above the ground in advance.

Then, the air transporting controller 18 transports the low temperature air in the upper zone of the atmosphere through the air transporting pipes 15a and 15b to the upper portion of the ground.

The low temperature air transported above the ground forms an interface with the high temperature air thereabove, and creates a cloud by increasing the relative humidity by cooling the high-temperature air at the interface.

The embodiment of the present invention may be implemented more environmentally-friendly and at low cost since it is not necessary to spray cloud seeds in order to generate clouds.

According to the embodiment of the present invention, it is possible to implement functions such as cooling, drying, and purifying of the surrounding air, removing mist, or generating clouds through the transport of dry and low-temperature clean air in the upper zone of the atmosphere with a simple structure.

In addition, according to the embodiment of the present invention, it is possible to freely adjust a height of air control because there is no need to install a post tower to support an elevating device because it supports the floating body 11 on the ground without the post tower.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. An air control system using air in an upper zone of the atmosphere, comprising:
   a floating body (11) provided to stay in the upper zone of the atmosphere;
   air transporting pipes (15a) and (15b) interlocked with the floating body (11) to transport air in the upper zone of the atmosphere;
   blowers (22a) and (22b) mounted below the air transporting pipe (15a) and (15b);
   an air transporting controller (18) controlling an operation of the blowers (22a) and (22b);
   a gas regulator to control an amount of internal gas of the floating body (11);
   a floating height adjuster to control a floating height of the floating body (11) through the air transporting controller (18),
   wherein
   the floating height adjuster (23) includes
   a fixed floating body wire (13) connected to limit the floating height of the floating body (11); and
   a floating body power source (19) provided at an end of the fixed floating body wire and providing power to wind or unwind the fixed floating body wire, and
   wherein
   the air transporting pipes (15a) and (15b) are provided with a female thread air transporting pipe (15c) having a female thread type of fastening structure at an upper portion thereof and a male thread air transporting pipe (15d) having a male thread type of fastening structure at a lower structure thereof.

2. The air control system using the air in the upper zone of the atmosphere of claim 1, further comprising
   an air measuring device (12) measuring air quality in the upper zone of the atmosphere,
   wherein the air transporting controller controls the blowers (22a) and (22b) in response to the air quality.

3. The air control system using the air in the upper zone of the atmosphere of claim 1, wherein
   air inflow parts (14a) and (14b) into which the air flows are formed at upper portions of the air transporting pipes (15a) and (15b), and
   air discharging parts (16a) and (16b) from which the air is discharged are formed at lower portions of the air transporting pipes (15a) and (15b).

4. The air control system using the air in the upper zone of the atmosphere of claim 1, further comprising
   a controller (21) receiving an input of operator's selection, wherein the air transporting controller (18) operates according to selection of the controller (21).

5. The air control system using the air in the upper zone of the atmosphere of claim 1, further comprising
   a heat insulator that insulates the air transporting pipes (15a) and (15b).

6. A method implemented by the air control system using the air in the upper zone of the atmosphere of claim 1,
   wherein, by using the air in the upper zone of the atmosphere, air control functions including cooling, drying, air-purifying, mist-removing, or cloud-generating in an air discharging area of the air transporting pipe are implemented.

* * * * *